(12) United States Patent
Nakate et al.

(10) Patent No.: US 8,328,291 B2
(45) Date of Patent: Dec. 11, 2012

(54) TRANSPORTER VEHICLE

(75) Inventors: Yohei Nakate, Tsuchiura (JP); Shinji Akino, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/121,446

(22) PCT Filed: Jan. 28, 2010

(86) PCT No.: PCT/JP2010/051138
§ 371 (c)(1),
(2), (4) Date: Mar. 29, 2011

(87) PCT Pub. No.: WO2010/092873
PCT Pub. Date: Aug. 19, 2010

(65) Prior Publication Data
US 2011/0175427 A1    Jul. 21, 2011

(30) Foreign Application Priority Data
Feb. 16, 2009   (JP) .................................. 2009-32847

(51) Int. Cl.
*B60P 1/16* (2006.01)
(52) U.S. Cl. .................................................... 298/22 C
(58) Field of Classification Search ................ 298/17 R, 298/19 R, 22 R, 22 C
See application file for complete search history.

(56) References Cited

U.S. PATENT DOCUMENTS

| 6,568,763 | B2 * | 5/2003 | Uematsu et al. ............ 298/22 C |
| 7,604,300 | B2 * | 10/2009 | Whitfield et al. ........... 298/22 C |
| 7,740,323 | B2 * | 6/2010 | Kaneko et al. .............. 298/22 C |
| 8,033,614 | B2 * | 10/2011 | Nabeshima et al. ........ 298/22 C |
| 8,042,876 | B2 * | 10/2011 | Tamura et al. .............. 298/22 C |
| 2009/0102273 | A1 * | 4/2009 | Kaneko et al. .............. 298/22 C |
| 2009/0218875 | A1 * | 9/2009 | Tamura et al. .............. 298/22 C |
| 2010/0026079 | A1 | 2/2010 | Nabeshima et al. |

FOREIGN PATENT DOCUMENTS

| JP | 54-6170 Y2 | 3/1979 |
| JP | 2001-105956 A | 4/2001 |
| JP | 2002-307996 A | 10/2002 |
| JP | 2006-347502 A | 12/2006 |
| WO | 2008/099691 A1 | 8/2008 |
| WO | WO 2008099691 A1 * | 8/2008 |

* cited by examiner

*Primary Examiner* — H Gutman
(74) *Attorney, Agent, or Firm* — Mattingly & Malur, PC

(57) ABSTRACT

In the course of largely tilting a vessel (3) backward of a vehicle body (2) by a hoist cylinder (10), occasionally the rear end portion of the vessel (3) runs into an embankment (4A) of dumped earth and sand. In consequence, a load by a vehicle weight to be applied to a rear suspension (8A) suspending the side of a rear wheel (8) of a vehicle is rapidly reduced. Therefore, an inner pressure (P) in the rear suspension (8A) detected by a pressure sensor (25) is rapidly lowered. In this case, a controller (27) controls the hoist cylinder (10) according to the inner pressure (P) in the rear suspension (8A) to stop an extension operation of the hoist cylinder (10). This can suppress occurrence of a state where the side of the rear wheel (8) of the vehicle body (2) is raised upward, that is, a jack-up state.

5 Claims, 5 Drawing Sheets

TRANSPORTER VEHICLE

TECHNICAL FIELD

The present invention relates to a transporter vehicle such as a dump truck and the like which is suitably used in transporting crushed stones or earth and sand excavated from such as an open-pit stope, a stone quarry or a mine.

BACKGROUND ART

In general, a large-sized transporter vehicle called a dump truck has a liftable vessel (loading platform) on a frame of a vehicle body, and carries and transports objects to be transported such as crushed stones or earth and sand in a state in which the objects to be transported are loaded in a large quantity on the vessel (for example, Japanese Patent Laid-Open No. 2001-105956 A and Japanese Patent Laid-Open No. 2006-347502 A).

A transporter vehicle of this type according to the prior art comprises an automotive vehicle body, a loading platform which is tiltably (liftably) provided on the vehicle body and on which the objects to be transported are loaded; a hoist cylinder which is telescopically provided between the loading platform and the vehicle body and extends at the time of dumping the objects to be transported from the loading platform so as to tilt the loading platform diagonally backward of the vehicle body; and control means for controlling a motion of the hoist cylinder.

This type of transporter vehicle self-travels to the transportation destination in a state of loading earth and sand or crushed stones in the loading platform and thereafter, extends the hoist cylinder to diagonally backward raise the loading platform. This raising operation dumps the earth and sand or the crushed stones to a cargo collection site along a tilting direction of the loading platform. At this time, since the loading platform is largely tilted backward of the vehicle body according to an extension operation of the hoist cylinder, the earth and sand or the crushed stones in the loading platform slide from a top surface (tilted surface) of the loading platform to be discharged (dumped) to an outside.

After such a dumping operation is completed, the hoist cylinder is contracted by a manual operation of an operation lever or the hoist cylinder is contracted by a self weight of the loading platform side. This operation causes the loading platform to bow down so as to gradually fall down to a position where the loading platform is seated on the vehicle body.

SUMMARY OF THE INVENTION

Incidentally in the transporter vehicle according to the aforementioned prior art, the loading platform is largely tilted backward of the vehicle body at the dumping operation time of dumping the earth and sand from the loading platform. Therefore, there are some cases where a rear end portion of the tilted loading platform runs on a block (banking) of the dumped earth and sand. At the time of further increasing a tilting angle of the loading platform from that state, there occurs a state where the vehicle floats up at the rear wheel side, that is, a so-called jack-up state.

That is, when the rear end portion of the loading platform runs on the banking of the dumped earth and sand in a state where the loading platform is largely tilted backward of the vehicle body, this running-on position serves as a fulcrum to produce a state (jack-up state) where the rear wheel side of the vehicle body is raised upward. Since the rear side of the vehicle body is raised upward together with the loading platform in this jack-up state, an entire vehicle becomes unbalanced and there is raised a problem that there occurs a risk of vehicle overturn at worst.

The present invention is made in view of the problem in the above prior art, and an object of the present invention is to provide a transporter vehicle which can improve stability, security and the like of a vehicle by preventing a vehicle body from becoming in a jack-up state at a dumping operation of earth and sand or the like.

For solving the above problem, the present invention is applied to a transporter vehicle comprising an automotive vehicle body with front wheels and rear wheels, a loading platform tiltably provided on the vehicle body to load objects to be transported, a hoist cylinder provided between the loading platform and the vehicle body and tilting the loading platform backward at the time of dumping the objects to be transported from the loading platform, a rear suspension provided in the rear wheel side of the vehicle body, and control means for controlling a motion of the hoist cylinder.

(1) The feature of the arrangement applied by the present invention lies in the arrangement that a pressure sensor is provided in the rear suspension for detecting an inner pressure in the rear suspension, wherein the control means is, in a case where the inner pressure in the rear suspension detected by the pressure sensor is lowered in the course of extending the hoist cylinder for tilting the loading platform backward, constituted to perform control of stopping the motion of the hoist cylinder in the extension direction.

As mentioned above, according to the present invention, when the hoist cylinder raises up the loading platform in such a manner as to be tilted backward, a change in the inner pressure in the rear suspension detected by the pressure sensor is monitored and the motion of the hoist cylinder can be controlled in response to the change of the inner pressure. Namely, when the rear end portion of the loading platform runs on a block of the dumped earth and sand (banking) in the course of largely tilting the loading platform backward of the vehicle body, a reaction caused by an extension operation of the hoist cylinder exerts on the rear wheel side of the vehicle. Therefore, there occurs a state where the rear wheel side of the vehicle is raised upward, that is, a jack-up state. When the jack-up state occurs, a load of the vehicle weight to be applied on the rear suspension suspending the rear wheel side of the vehicle is rapidly reduced. Therefore, the inner pressure in the rear suspension detected by the pressure sensor is rapidly dropped. In this case, however, the control means can stop the extension operation of the hoist cylinder so as to restrict the vehicle to become in a jack-up state.

(2) According to the present invention, the control means is constituted to output a signal for informing that the vehicle body is in a jack-up state when the inner pressure in the rear suspension is lower than a predetermined given pressure value.

When the inner pressure in the rear suspension is lower than the predetermined given pressure value, the jack-up state of the vehicle body is informed to an operator of the vehicle. In consequence, even in a case where the extension operation of the hoist cylinder is rapidly stopped, the operator can know the reason on the spot and appropriately take emergency action after that. Accordingly, the operator can easily correct the jack-up state of the vehicle, for example, by performing an operation of lowering the loading platform to a lowering position from the tilting state by the control lever.

(3) According to the present invention, the predetermined pressure value is set to a value lower than the inner pressure in the rear suspension detected by the pressure sensor in an unloading state where any load is not placed on the loading platform. Therefore, when the inner pressure of the rear suspension is lowered to the pressure value which can not be generated normally, it can be determined that the vehicle is in a jack-up state.

(4) The present invention comprises a hydraulic source supplying and discharging pressurized oil to and from the hoist cylinder for extending and contracting the hoist cylinder, and a valve device provided between the hydraulic source and the hoist cylinder to control the supply and discharge of the pressurized oil to and from the hoist cylinder, wherein the valve device has plural switching positions composed of a raising position of raising the loading platform by extending the hoist cylinder with the supply and discharge of the pressurized oil, a lowering position of rotating the loading platform downward by contracting the hoist cylinder with the supply and discharge of the pressurized oil, a floating position of allowing a self weight fall of the loading platform by contracting the hoist cylinder with a self weight of the loading platform side, and a neutral position of stopping a motion of the hoist cylinder by stopping the supply and discharge of the pressurized oil.

In consequence, when the valve device is switched to the raising position, the hoist cylinder can be extended by supplying the pressurized oil from the hydraulic source to the hoist cylinder to raise the loading platform so as to be tilted backward of the vehicle body. When the valve device is returned from the raising position to the neutral position, the supply and discharge of the pressurized oil to the hoist cylinder can be stopped to stop the motion of the hoist cylinder.

(5) According to the present invention, the control means is constituted in such a manner that, at the time of extending the hoist cylinder by switching the valve device to the raising position according to the operation of the operator for tilting the loading platform backward, when the inner pressure of the rear suspension is lowered, the valve device is switched from the raising position to the neutral position.

In consequence, when the inner pressure in the rear suspension is lowered to the pressure value which can not be generated normally, the control means can switch the valve device from the raising position to the neutral position to stop the extension operation of the hoist cylinder, thus restricting the occurrence of the jack-up state.

MODE FOR CARRYING OUT THE INVENTION

Hereinafter, a transporter vehicle according to an embodiment of the present invention will be explained in greater detail with reference to the accompanying drawings, by citing as an example a dump truck transporting crushed stones excavated in a mine as an example.

Here, FIG. 1 to FIG. 5 show a transporter vehicle according to an embodiment of the present invention.

Figure 1:
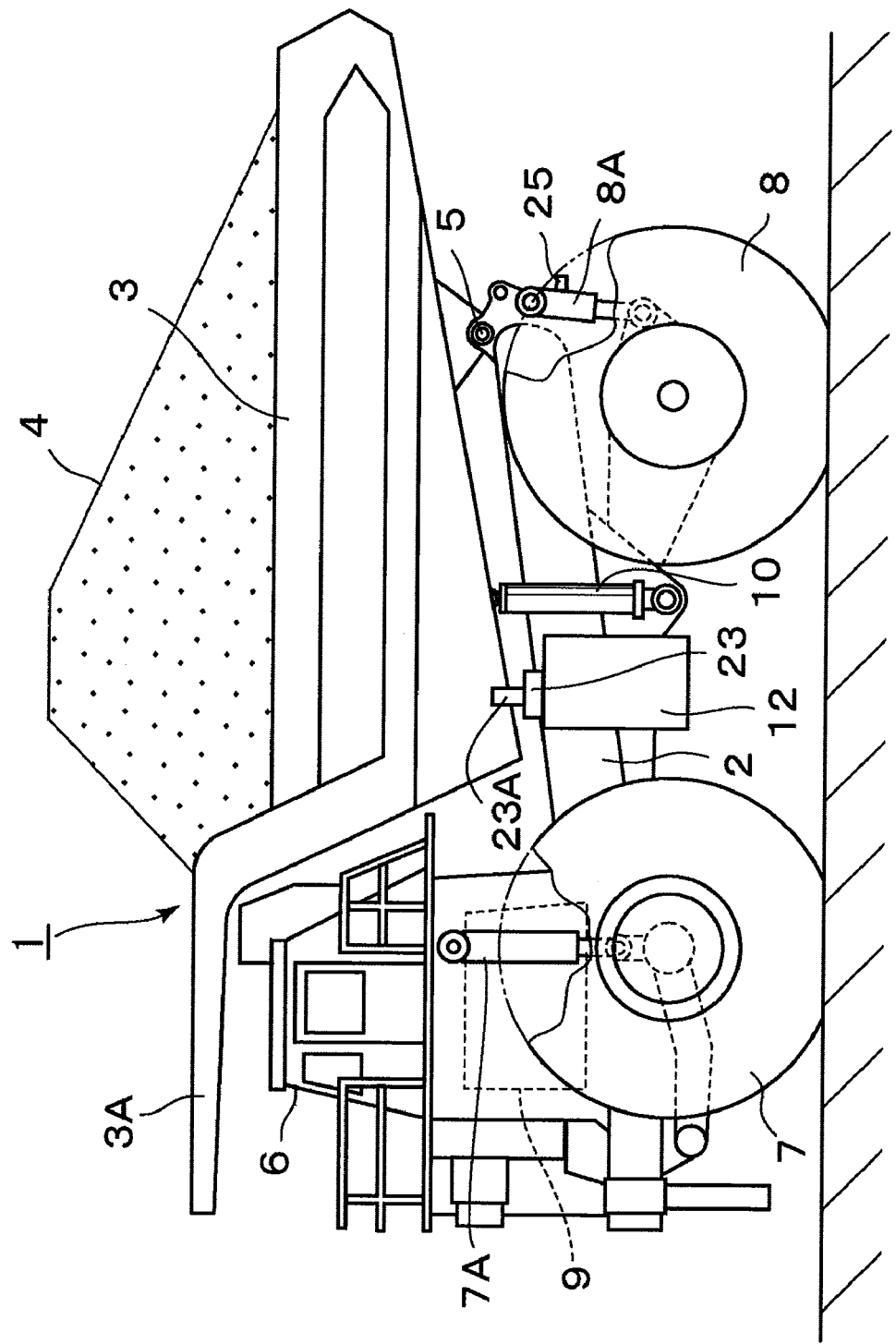
FIG. 1 is a front view showing a dump truck according to an embodiment of the present invention.
Figure 2:
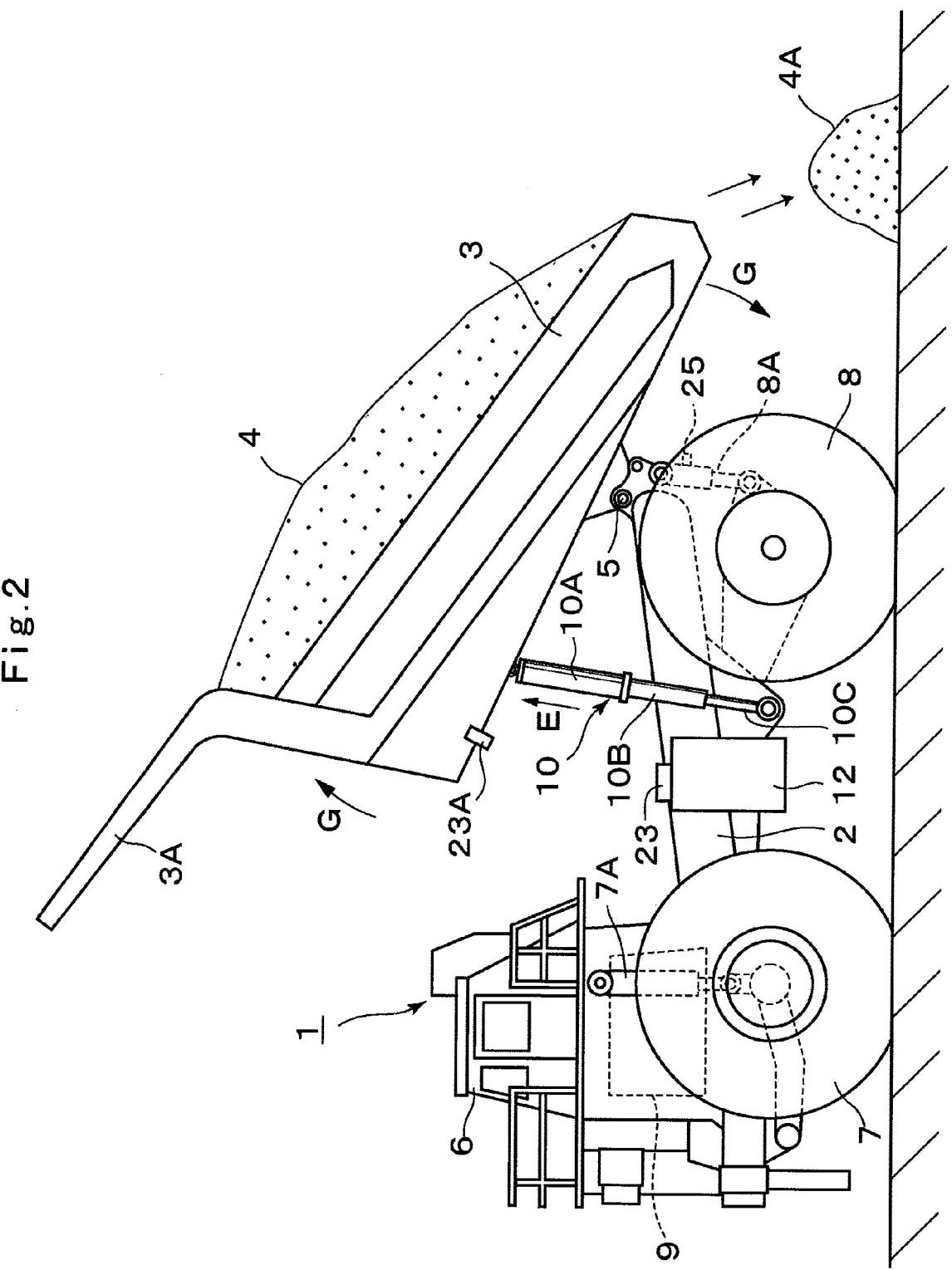
FIG. 2 is a front view showing a state of diagonally backward tilting a vessel of the dump truck to a dumping position.

In the figure, designated at 1 is a dump truck which is a large-size transporter vehicle. The dump truck 1 is largely constituted by a vehicle body 2 having a rigid frame structure as shown in FIG. 1 and FIG. 2 and a vessel 3 as a loading platform tiltably (liftably) mounted on the vehicle body 2.

The vessel 3 is formed as a large-size container whose overall length reaches as much as 10 to 13 meters to load a large volume of objects to be transported such as crushed stones or other similar objects (hereinafter, called crushed stones 4). A rear side bottom portion of the vessel 3 is tiltably coupled to a rear end side of the vehicle body 2 by using a connecting pin 5. A protector 3A is integrally provided on a front side upper portion of the vessel 3 in such a manner as to cover a cab 6 to be described later from an upper side thereof.

The bottom side of the vessel 3 is rotatably supported by the rear side of the vehicle body 2 by using the connecting pin 5. As a hoist cylinder 10 to be described later is extended or contracted, the front side (protector 3A side) of the vessel 3 is rotated (raised or lowered) vertically with a position of the connecting pin 5 as a fulcrum. In consequence, the vessel 3 is rotated between a transporting position shown in FIG. 1 and dumping positions shown in FIG. 2 and FIG. 3, and at the dumping position shown in FIG. 3, a large number of the crushed stones 4 loaded in the vessel 3 are dumped at a predetermined cargo collection site so as to slide down from the vessel 3 which has tilted backward.

Figure 4:
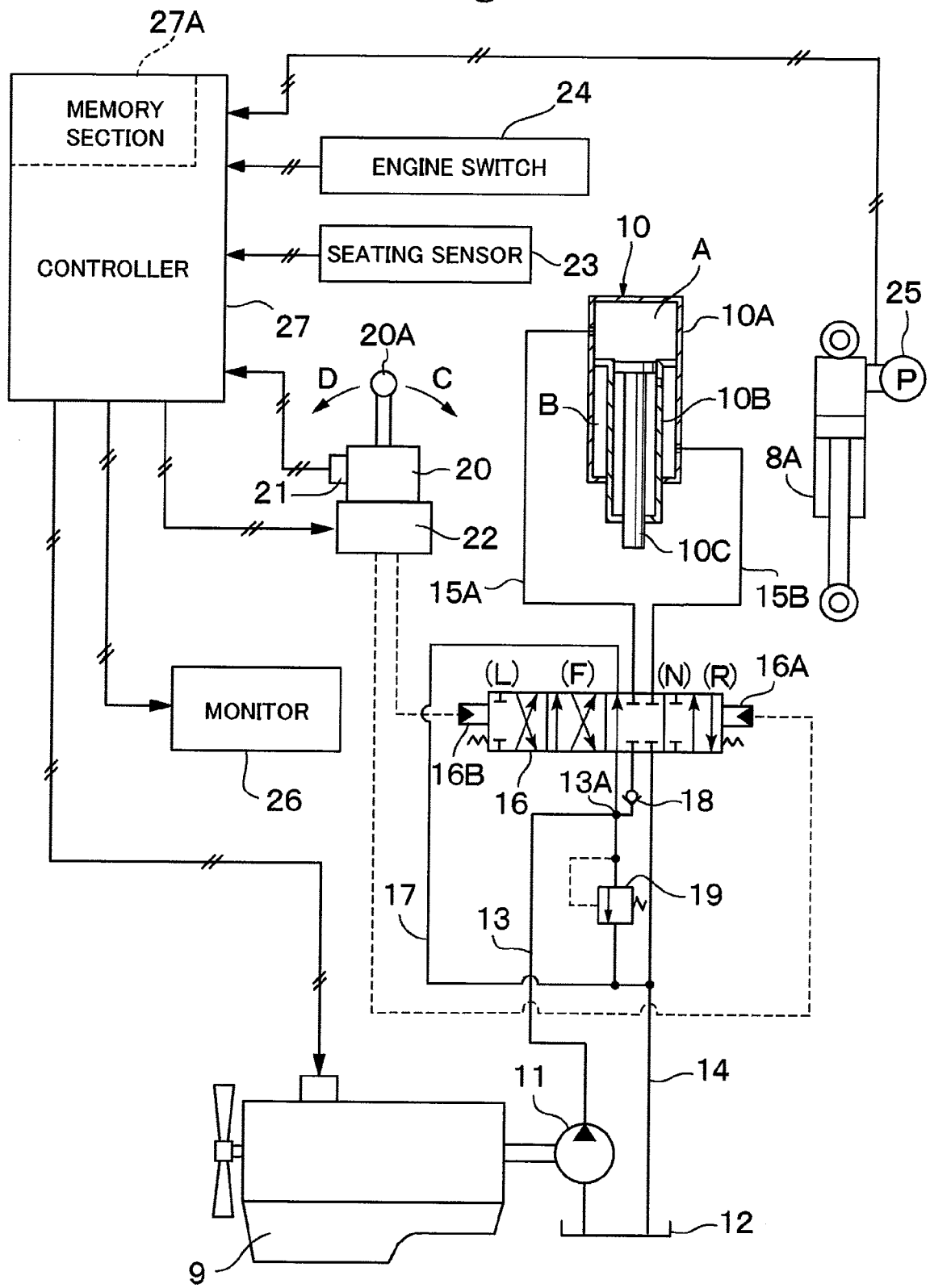
FIG. 4 is a control circuit diagram including a hydraulic circuit for extending, contracting or stopping the hoist cylinder.

Indicated at 6 is a cab which is provided in the front portion of the vehicle body 2 to be located under the lower side of the protector 3A. The cab 6 defines an operating room where an operator of the dump truck 1 gets on/off. An operator's seat, a handle for steering, an accelerator pedal, a brake pedal (none are shown), control levers 20A to be described later (only one are shown in FIG. 4), an engine switch 24, and the like are provided inside the cab 6.

The protector 3A of the vessel 3 protects the cab 6 from flying stones containing rocks by completely covering the cab 6 from the upper side. The protector 3A has a function of protecting the operator in the cab 6 at the time the vehicle (dump truck 1) falls down.

Denoted at 7 are right and left front wheels (only one is shown) which are provided rotatably on the front side of the vehicle body 2, and the front wheels 7 constitute steered wheels which are steered (steering operation) by an operator of the dump truck 1. Further, the front wheel 7 is formed with a tire diameter (outside diameter dimension) of, for example, as much as 2 to 4 meters in the same way as rear wheels 8 to be described later. A front suspension 7A constituted by hydraulic shock absorbers or the like is provided between the front portion of the vehicle body 2 and the front wheels 7. The front suspension 7A suspends the front side of the vehicle body 2 between the front wheels.

Denoted at 8 are right and left rear wheels (only one is shown) which are rotatably provided on the rear side of the vehicle body 2, and the rear wheels 8 constitute drive wheels of the dump truck 1 which are driven and rotated by a traveling drive unit (not shown). A rear suspension 8A constituted by hydraulic shock absorbers or the like is provided between the rear portion of the vehicle body 2 and the rear wheels 8. This rear suspension 8A suspends the rear side of the vehicle body 2 between the rear wheels 8. On the other hand, an inner pressure P in the rear suspension 8A is detected by a pressure sensor 25 to be described later.

Indicated at 9 is an engine as a motor provided in the vehicle body 2 to be located under the cab 6. This engine 9 is constituted, for example, by a large-size diesel engine and rotates a hydraulic pump 11 shown in FIG. 4 to be described later.

Designated at 10 are a pair of right and left hoist cylinders (only one is shown in FIG. 1 and FIG. 4) telescopically provided between the vehicle body 2 and the vessel 3. This hoist cylinder 10 is formed of a multi-stage (for example, two-stage) hydraulic cylinder. As shown in FIG. 4, the hoist cylinder 10 is constituted by an outer tube portion 10A positioned at the outer side, an inner tube portion 10B telescopically provided inside the outer tube portion 10A to define an interior of the outer tube portion 10A with an upper side oil chamber A and a lower side oil chamber B, and a piston rod 10C telescopically provided inside the inner tube portion 10B.

Figure 3:
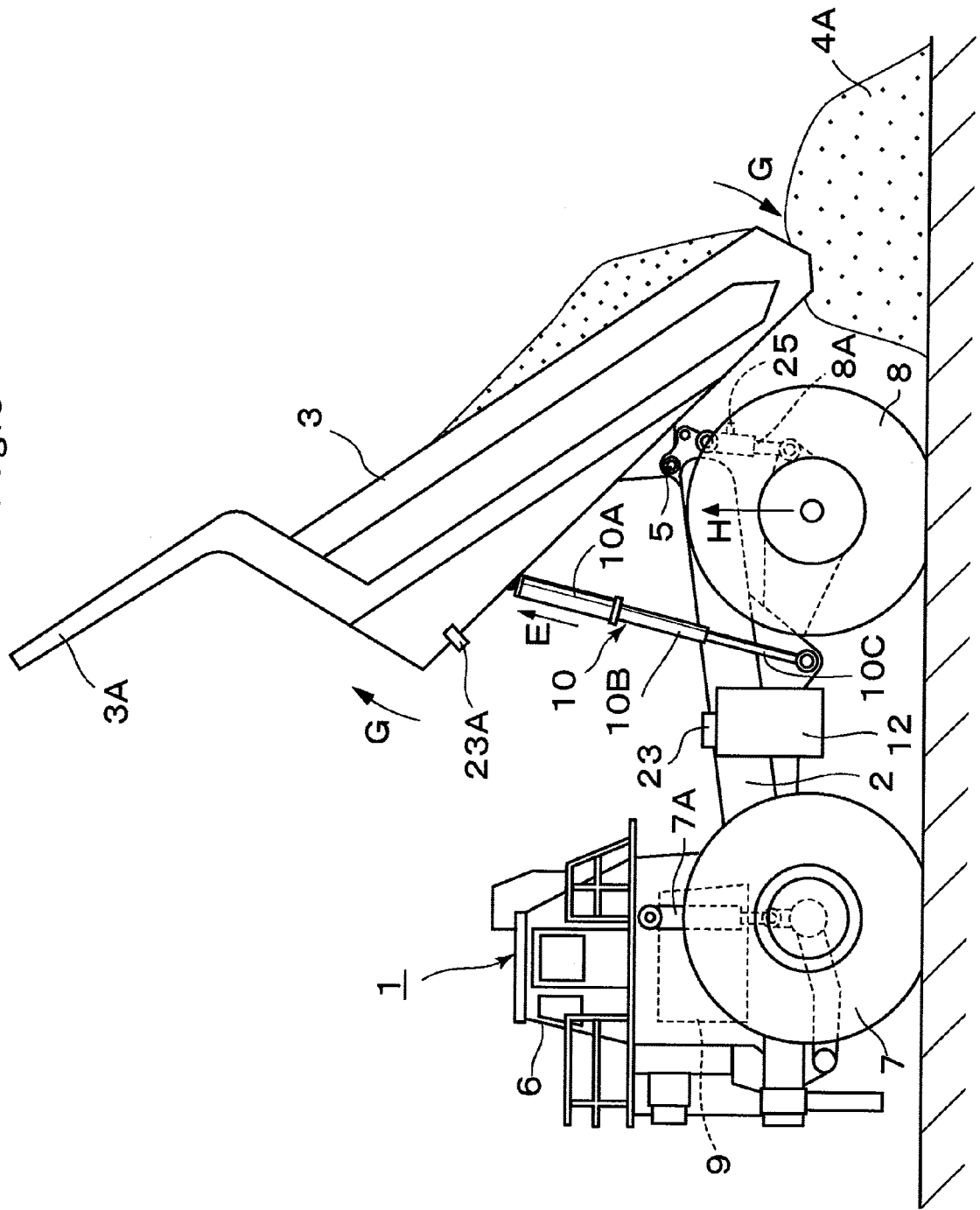
FIG. 3 is a front view showing a state of largely tilting the vessel of the dump truck further backward from the position in FIG. 2.

The hoist cylinder 10 is configured such that, when a pressurized oil is supplied into the oil chamber A from the hydraulic pump 11 to be described later, the piston rod 10C extends downward. In consequence, the hoist cylinder 10 tilts (rotates) the vessel 3 diagonally backward by use of the connecting pin 5 as a fulcrum as shown in FIG. 2 and FIG. 3. On the other hand, the hoist cylinder 10 is controlled in such that, when the pressurized oil (oil liquid) is supplied inside the oil chamber B from the hydraulic pump 11, the piston rod 10C is contracted. In consequence, the hoist cylinder 10 rotates the vessel 3 to a transporting position (refer to FIG. 1) so as to bow downward by use of the connecting pin 5 as a fulcrum.

Next, the hydraulic circuit for driving the hoist cylinder 10 will be explained with reference to FIG. 4.

Denoted at 11 is the hydraulic pump driven by the engine 9. The hydraulic pump 11 constitutes a hydraulic source together with an operating oil tank 12 (hereinafter, called a tank 12). As shown in FIG. 1 to FIG. 3, the tank 12 is mounted on the side surface of the vehicle body 2 to be located under the vessel 3. The operating oil (oil liquid) accommodated inside the tank 12 is suctioned into the hydraulic pump 11 when the hydraulic pump 11 is driven by the engine 9. Therefore, high-pressure oil is discharged into a pump line 13 from a discharge side of the hydraulic pump 11. The returned oil from the hoist cylinder 10 is discharged through a low-pressure tank line 14 to the tank 12.

Indicated at 15A and 15B are a pair of hydraulic conduits connected to the oil chambers A and B in the hoist cylinder 10. The hydraulic conduits 15A and 15B are connected through the valve device 16 to be described later to the hydraulic sources (the hydraulic pump 11 and the tank 12). The hydraulic conduits 15A and 15B serve to supply the pressurized oil from the hydraulic pump 11 to the oil chambers A and B in the hoist cylinder 10 or discharge the oil liquid from the oil chambers A and B.

Denoted at 16 is the valve device provided between the hydraulic pump 11, the tank 12 and the hoist cylinder 10. The valve device 16 is configured by a hydraulic pilot type directional control valve having six ports and four positions, for example. The valve device 16 is selectively switched to either one of a neutral position (N), a raising position (R), a floating position (F) and a lowering position (L).

That is, the valve device 16 is switched from the neutral position (N) to the raising position (R) when a pilot pressure is supplied from a control lever device 20 to be described later to a hydraulic pilot portion 16A of one side.

The valve device 16 is switched from the neutral position (N) to the floating position (F) when the pilot pressure is supplied from the control lever device 20 to a hydraulic pilot portion 16B of the other side. At this time, as the pilot pressure further increases, the valve device 16 is switched from the floating position (F) to the lowering position (L). As shown in FIG. 4, the valve device 16 is in a retaining position for stopping an extension/contraction motion of the hoist cylinder 10 at the time the valve device 16 is displaced in the neutral position (N). In this retaining position, supply and discharge of the pressurized oil to the hoist cylinder 10 through the hydraulic conduits 15A and 15B are stopped.

When the valve device 16 is switched from the neutral position (N) to the raising position (R), the pressurized oil from the hydraulic pump 11 is supplied through the pump line 13, the valve device 16, the hydraulic conduit 15A and the like into the oil chamber A in the hoist cylinder 10. The oil liquid inside the oil chamber B is returned through the hydraulic conduit 15B, the valve device 16, and the tank line 14 to the tank 12. Accordingly, the piston rod 10C of the hoist cylinder 10 extends due to the pressurized oil inside the oil chamber A, and the vessel 3 is raised to a discharged position shown in FIG. 2 and FIG. 3.

When the valve device 16 is switched from the neutral position (N) to the floating position (F), the pump line 13 is connected through the hydraulic conduit 15B to the oil chamber B in the hoist cylinder 10, and the oil chamber A in the hoist cylinder 10 is connected through the hydraulic conduit 15A to the tank line 14. In the floating position (F), however, a bypass conduit 17 to be described later is communicated with the pump line 13 and the tank line 14 by the valve device 16. Therefore, the high-pressure oil is not supplied through the hydraulic conduit 15B to the oil chamber B in the hoist cylinder 10, and each pressure in the oil chambers A and B is lowered to a pressure close to a tank pressure.

In consequence, the hoist cylinder 10 is contracted according to the load (self weight) from the vessel 3, and the oil liquid is discharged from the oil chamber A to the tank 12. On the other hand, the oil liquid is resupplied through a check valve 18 to be described later into the oil chamber B. That is, the valve device 16 allows the fall (return) of the vessel 3 with the self weight at the time of being displaced in the floating position (F).

When the valve device 16 is switched to the lowering position (L), the pressurized oil from the hydraulic pump 11 is supplied through the pump line 13 and the hydraulic conduit 15B into the oil chamber B in the hoist cylinder 10. At this time, the oil liquid inside the oil chamber A is returned through the hydraulic conduit 15A and the tank line 14 to the tank 12. In consequence, in the hoist cylinder 10, the inner tube portion 10B contracts into the outer tube portion 10A together with the piston rod 10C due to the pressurized oil supplied inside the oil chamber B. Accordingly, the vessel 3 is rotated downward to the transporting position shown in FIG. 1 with a hydraulic force of the hoist cylinder 10 to be lowered to a position to be seated on the vehicle body 2.

Indicated at 17 is the bypass conduit constituting a part of the valve device 16. The bypass conduit 17 connects between the pump line 13 and the tank line 14 by bypassing the valve device 16. That is, when the valve device 16 is displaced in the neutral position (N) and in the floating position (F), the bypass conduit 17 establishes communications between the pump line 13 and the tank line 14 to hold a pressure in the pump line 13 substantially equal to a low pressure in the tank line 14. That is, the hydraulic pump 11 is in an unloading operating condition in the neutral position (N) and in the floating position (F), and a discharging pressure of the hydraulic pump 11 is maintained to be in a low-pressure state close to a tank pressure.

On the other hand, when the valve device 16 is switched to either one of the raising position (R) and the lowering position (L), the bypass conduit 17 is blocked to cut off the communication between the pump line 13 and the tank line 14. That is, the hydraulic pump 11 is switched from the unloading operating condition to the loading operating condition in the raising position (R) and the lowering position (L), and the discharging pressure of the hydraulic pump 11 rises up in accordance with a load pressure of the hoist cylinder 10.

Indicated at 18 is the check valve disposed in the midway of the pump line 13. The check valve 18 is provided in the midway portion of the pump line 13 positioned between a joining point 13A of the pump line 13 and the bypass conduit 17 and the valve device 16. The check valve 18 is operated to permit the oil liquid (including the pressurized oil) to flow from the pump line 13 to the valve device 16 and prevent a reverse flow thereof.

Indicated at 19 is a relief valve provided in the midway of the bypass conduit 17. The relief valve 19 makes communication and blockade of the bypass conduit 17 to the tank line 14 at a position downstream of the joining point 13A between the pump line 13 and the bypass conduit 17. The relief valve 19 determines the maximum discharge pressure of the hydraulic pump 11, and when a pressure more than the maximum discharge pressure is generated in the pump line 13, the relief valve 19 relieves that pressure as an excessive pressure to the side of the tank 12.

Denoted at 20 is the control lever device as operating means of the valve device 16. The control lever device 20 is configured by an electric lever device, for example. The control lever device 20 has a control lever 20A operated to be tilted by an operator in the cab 6. The control lever 20A is tilted selectively in the directions of the arrows C and D in FIG. 4 corresponding to the raising position (R), the floating position (F) and the lowering position (L) of the valve device 16.

In this case, the control lever 20A switches the valve device 16 from the neutral position (N) to the raising position (R) at the time of being tilted in the direction of the arrow C from the neutral position shown in FIG. 4. At this time, the pilot pressure is supplied from a pilot pressure generator 22 to be described later to the hydraulic pilot portion 16A of the valve device 16. It should be noted that when the operator releases its hand from the control lever 20A in this state, the control lever 20A is automatically returned to the neutral position shown in a solid line in FIG. 4 by a returning spring (not shown).

When the operator tilts the control lever 20A in the direction of the arrow D against the returning spring, the control lever 20A is held by itself in the midway position. At this time, the pilot pressure is supplied from the pilot pressure generator 22 to be described later to the hydraulic pilot portion 16B of the valve device 16, and the valve device 16 is switched from the neutral position (N) to the floating position (F).

When the control lever 20A is tilted further from the self-holding state to the direction of the arrow D in FIG. 4, a larger pilot pressure is supplied from the pilot pressure generator 22 to be described later to the hydraulic pilot portion 16B of the valve device 16, and at this time, the valve device 16 is switched to the lowering position (L). Further, when the operator releases its hand from the control lever 20A in this state, the control lever 20A is automatically returned to the above self-holding state (self-holding position) by the other returning spring (not shown).

Indicated at 21 is a lever sensor attached to the control lever device 20. The lever sensor 21 detects a tilting position of the control lever 20A tilted by the operator and outputs the detection signal to a controller 27 to be described hereinafter. The lever sensor 21 serves to detect which switching position among the neutral position (N), the raising position (R), the floating position (F) and the lowering position (L) the valve device 16 controlled to be switched by the control lever device 20 is in.

Indicated at 22 is the pilot pressure generator attached to the control lever device 20, and the pilot pressure generator 22 is configured by an electricity/hydraulic conversion device formed of an electromagnetic proportional valve, for example. The pilot pressure generator 22, for generating a pilot pressure corresponding to a tilting operation of the control lever 20A as above mentioned, converts an electrical signal from the control lever device 20 into the pilot pressure as mentioned above.

It should be noted that the embodiment is constituted in such a manner that the pilot pressure generator 22 generates the pilot pressure corresponding to the tilting operation of the control lever 20A according to a control signal outputted from the controller 27 to be described hereinafter. However, instead of such an arrangement, the control signal may be outputted directly to the pilot pressure generator 22 from the control lever device 20, not via the controller 27, for example.

On the other hand, the pilot pressure generator 22, when a stop signal is outputted from the controller 27 to be described later, rapidly lowers the pilot pressure to be supplied to the hydraulic pilot portions 16A and 16B of the valve device 16 to the order of the tank pressure. In consequence, the valve device 16 is returned to the neutral position (N).

Denoted at 23 is a seating sensor which detects whether or not the vessel 3 is seated on the vehicle body 2. As shown in FIG. 1 and FIG. 2, the seating sensor 23 is formed of a contact type sensor which is positioned on the upper side of the tank 12 to be disposed at the side of the vehicle body 2. The seating sensor 23 detects whether a projecting object 23A as a detection object provided at the side of the vessel 3 is in contact with or away from the seating sensor 23. In the present embodiment, the seating sensor 23 is configured as loading platform state detecting means for detecting in which state the vessel 3 is on the vehicle body 2 and outputs the detection signal to the controller 27 to be described hereinafter.

Denoted at 24 is the engine switch provided in the cab 6 and the engine switch 24 serves as a start switch of the engine 9. Here, the engine 9 is activated or stopped by manually operating the engine switch 24 by an operator seated on a driver's seat.

Denoted at 25 is the pressure sensor provided in the rear suspension 8A at the side of the rear wheel 8, and the pressure sensor 25 detects an inner pressure P (hereinafter, called an inner pressure P) in the rear suspension 8A and outputs the detection signal to the controller 27 to be described hereinafter.

Indicated at 26 is a monitor as informing means for informing an abnormality of the dump truck 1, and the monitor 26 is constituted by a display provided in the cab 6, for example. The monitor 26, when the vehicle body 2 gets close to a jack-up state as described later, displays this state on a screen according to a warning signal to be described later.

Designated at 27 is the controller as control means composed of a microcomputer and the like, and the controller 27 has an input side connected to the lever sensor 21, the seating sensor 23, the engine switch 24, the pressure sensor 25 of the rear suspension 8A side and the like and an output side connected to the engine 9, the pilot pressure generator 22, the monitor 26 and the like.

The controller 27 is provided with a memory section 27A composed of a ROM, a RAM and the like. A processing program for performing jack-up prevention shown in FIG. 5 to be described later and a determination pressure Pa as a predetermined pressure value for determining a jack-up state of a vehicle based upon an inner pressure P of the rear suspension 8A are stored in the memory section 27A. The determination pressure Pa is a sufficiently lower pressure as compared to a pressure value at the time of detecting an inner pressure P of the rear suspension 8A by the pressure sensor 25 in an unloading state where crushed stones 4 are not loaded in the vessel 3.

Here, the controller 27 performs control for preventing jack-up occurrence at an unloading operation according to the processing program in FIG. 5 to be described hereinafter. Namely, the controller 27 determines whether or not the vehicle (dump truck 1) is getting close to the jack-up state based upon detection signals from the lever sensor 21, the seating sensor 23 and the pressure sensor 25. When the controller 27 determines that the vehicle is getting close to the jack-up state, the controller 27 is served to perform control for switching the valve device 16 from the raising position (R) to the neutral position (N) for cancelling the raising control of the vessel 3.

The dump truck 1 according to the present embodiment is configured as described above. Next, the operation of the dump truck 1 will be explained.

First, in a stone-crushing site as a mine, a large-size hydraulic excavator (not shown) is used to load crushed stones 4 as objects to be transported on the vessel 3. At this time, the vessel 3 is placed in a transporting position shown in FIG. 1. The dump truck 1 transports and carries the crushed stones 4 to a predetermined cargo collection site in a state where a large number of the crushed stones 4 are loaded on the vessel 3.

When in the cargo collection site, an operator in the cab 6 manually tilts the control lever 20A in the control lever device 20 in the direction of the arrow C in FIG. 4, a control signal for raising operation is outputted to the pilot pressure generator 22 from the controller 27, for example. The pilot pressure generator 22 supplies a pilot pressure corresponding to the control signal at this time to the hydraulic pilot portion 16A in the valve device 16. It should be noted that the control lever device 20 may output the control signal directly to the pilot pressure generator 22, not via the controller 27.

Thereby, the valve device 16 is switched from the neutral position (N) to the raising position (R). The pressurized oil from the hydraulic pump 11 is delivered through the pump line 13, the valve device 16 and the hydraulic conduit 15A to the oil chamber A in the hoist cylinder 10, and on the other hand, the oil liquid in the oil chamber B in the hoist cylinder 10 is returned through the hydraulic conduit 15B, the valve device 16 and the tank line 14 to the tank 12.

As a result, the piston rod 10C in the hoist cylinder 10 extends in the direction of the arrow E (refer to FIG. 2) by the pressurized oil in the oil chamber A to raise the vessel 3 to the dumping position shown in FIG. 2 in such a manner as to tilt the vessel 3 diagonally backward. At this time, the dump truck 1 rotates the vessel 3 to a tilting posture as shown in FIG. 2 and FIG. 3 by the use of the connecting pin 5 as a fulcrum. Therefore, the crushed stones 4 in the vessel 3 are dumped to the cargo collection site in such a manner as to slide downward.

At this time, when an operator releases its hand from the control lever 20A, the control lever 20A automatically returns to a position (returning position) shown in FIG. 4 by the returning spring. Therefore, a control signal for stop operation is outputted to the pilot pressure generator 22 from the controller 27 to decrease the pilot pressure from the pilot pressure generator 22 to a pressure close to the tank pressure.

In consequence, the valve device 16 is automatically returned to the neutral position (N) to stop supply or discharge of the pressurized oil to or from the oil chambers A and B in the hoist cylinder 10. Thereby, the hoist cylinder 10 can maintain the piston rod 10C in an extending state and temporarily stop the vessel 3 as it is maintained in the tilting posture shown in FIG. 2 and FIG. 3. As a result, the crushed stones 4 in the vessel 3 are dumped in such a manner as to slide downward.

Next, when the dumping of the crushed stones 4 is completed, an operator manually tilts the control lever 20A in the direction of the arrow D in FIG. 4. In consequence, the controller 27 outputs a control signal for floating operation to the pilot pressure generator 22. The pilot pressure generator 22 supplies a pilot pressure in response to the control signal at this time to the hydraulic pilot portion 16B in the valve device 16 to switch the valve device 16 from the neutral position (N) to the floating position (F).

In consequence, the valve device 16 switched to the floating position (F) connects the pump line 13 through the hydraulic conduit 15B to the oil chamber B in the hoist cylinder 10. The oil chamber A in the hoist cylinder 10 is connected through the hydraulic conduit 15A to the tank line 14. Yet in the floating position (F), the valve device 16 communicates the pump line 13 with the tank line 14 through the bypass conduit 17.

As a result, the highly pressurized oil is not supplied through the hydraulic conduit 15B to the oil chamber B in the hoist cylinder 10, and each pressure in the oil chambers A and B is lowered to a pressure close to the tank pressure. In consequence, the hoist cylinder 10 is operated to contract according to a load (self weight) from the vessel 3 to discharge the oil liquid in the oil chamber A toward the tank 12 and on the other hand, to resupply the oil liquid into the oil chamber B through the check valve 18. Accordingly the hoist cylinder 10 permits the falling of the vessel 3 due to the self weight thereof to return the vessel 3 to the transporting position shown in FIG. 1 and be seated on the vehicle body 2.

On the other hand, when the dump truck 1 is tilted due to the bumpy operation site or on the sloping ground, even if the valve device 16 is switched to the floating position (F), the vessel 3 does not possibly fall down by the self weight. In such a case, however, an operator manually and largely tilts the control lever 20A in the direction of the arrow D in FIG. 4. In consequence, the controller 27 can output a control signal for lowering operation to the pilot pressure generator 22.

Therefore, the pilot pressure generator 22 outputs a pilot pressure in response to the control signal for lowering operation to the hydraulic pilot portion 16B in the valve device 16 to switch the valve device 16 to the lowering position (L). In consequence, the valve device 16 supplies the pressurized oil from the hydraulic pump 11 through the pump line 13 and the hydraulic conduit 15B into the oil chamber B in the hoist cylinder 10 and returns the oil liquid in the oil chamber A through the hydraulic conduit 15A and the tank line 14 back to the tank 12.

Thereby, the hoist cylinder 10 is operated in such a manner that the inner tube portion 10B contracts into the outer tube portion 10A together with the piston rod 10C due to the pressurized oil supplied into the oil chamber B. The vessel 3 is rotated downward to the transporting position as shown in FIG. 1 due to the hydraulic force of the hoist cylinder 10 to be seated on the vehicle body 2.

Thereafter, the operator of the dump truck 1 operates the control lever 20A to maintain the valve device 16 in a state of being switched from the lowering position (L) to the floating position (F). In consequence, the vessel 3 can be seated on the vehicle body 2 due to the self weight and also at vehicle traveling, the hoist cylinder 10 can be maintained in a contracted state using the self weight of the vessel 3 side.

Incidentally, for example, at an earth and sand-dumping operation of dumping the crushed stones 4 containing earth and sand from the vessel 3, the vessel 3 is largely tilted backward of the vehicle body 2 as described before. Therefore, the rear end portion of the vessel 3 possibly runs on a block of the dumped earth and sand (hereinafter called banking 4A) as shown in FIG. 3. Therefore, when a tilting angle of the vessel 3 is made large, the rear wheel 8 of the vehicle body 2 is in a state of being raised upward from the ground (in the direction of the arrow H in FIG. 3) by the use of the rear end portion of the vessel 3 which has run on the banking 4A as the fulcrum to produce a jack-up state. In this way, since the rear side of the vehicle body 2 is raised upward together with the vessel 3 in the jack-up state, the entire vehicle becomes unbalanced, and at worst, the vehicle is possibly fallen down.

Figure 5:
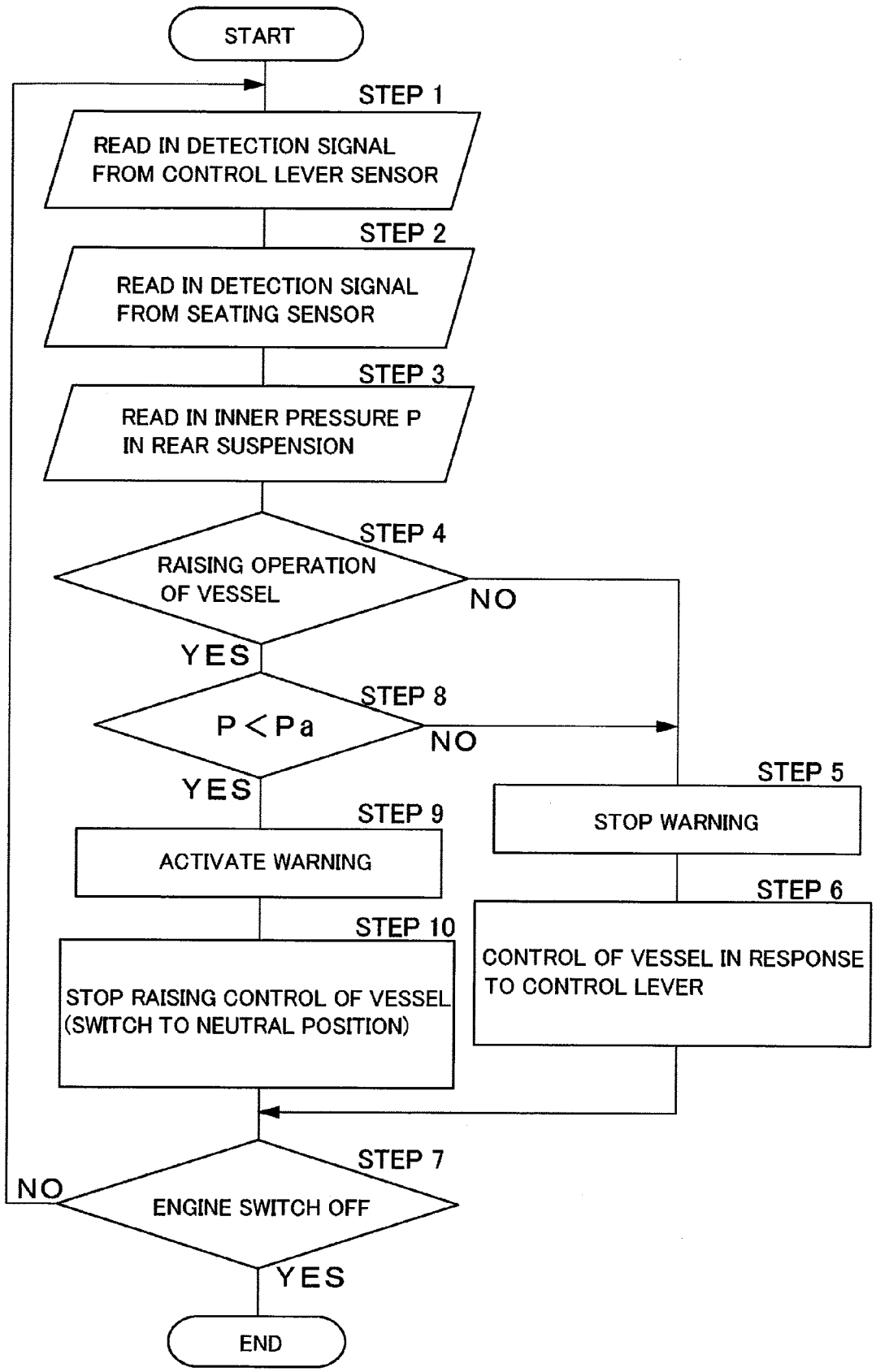
FIG. 5 is a flow chart showing the process order of jack-up prevention control of a vehicle performed by a controller in FIG. 4.

Therefore, according to the present embodiment, the jack-up prevention control by the controller 27 is performed along the processing program shown in FIG. 5. In consequence, this control can quickly restrict the vehicle to become in the jack-up state at the earth and sand-dumping operation as shown in FIG. 3.

That is, when the processing operation in FIG. 5 starts, at step 1 a detection signal from the lever sensor 21 is read, and at next step 2 a detection signal from the seating sensor 23 is read. At step 3, an inner pressure P in the rear suspension 8A is read from the pressure sensor 25.

At step 4 it is determined whether or not the vessel 3 is seated on the vehicle body 2 based upon the detection signal from the seating sensor 23, namely, a raising operation of the vessel 3 is performed. While it is determined as "NO" at step 4, it can be determined that the vessel 3 is seated on the vehicle body 2 and the raising operation of the vessel 3 is not performed. Therefore, the process goes to step 5, wherein the output of a warning signal or the like is controlled to be maintained in a stop state.

Next, at step 6, the raising control of the vessel 3 in response to the tilting operation of the control lever 20A continues to be performed. It should be noted that in the control of the vessel 3 at step 6, not only the raising control of the vessel 3, but also the lowering control of the vessel 3 in response to the tilting operation of the control lever 20A, the control of stopping the vessel 3 and the like are performed. In the processing at step 7 subsequent to step 6, it is determined whether or not the engine switch 24 is OFF (opened). Since the engine 9 is in a working state while at step 7 it is determined as "NO", the process goes back to step 1, and the processing subsequent to this step continues to be performed.

On the other hand, when it is determined as "YES" in the determination processing at step 4, it can be determined that the vessel 3 is away from the vehicle body 2 and the raising operation of the vessel 3 is started. Therefore, at this time the process goes to step 8, wherein it is determined whether or not an inner pressure P in the rear suspension 8A is lower than a determination pressure Pa. The determination pressure Pa is set as a pressure sufficiently lower than a pressure value of the inner pressure P in the rear suspension 8A detected by the pressure sensor 25 in an unloading state where any load is not placed on the vessel 3. While it is determined as "NO" at step 8, the process goes to step 5, wherein the output of a warning signal or the like is controlled to be maintained in a stop state. Next, at step 6, the raising control of the vessel 3 in response to the tilting operation of the control lever 20A continues to be performed.

In this case, while the raising control of the vessel 3 continues to be performed by the processing at step 6, the valve device 16 shown in FIG. 4 is switched from the neutral position (N) to the raising position (R). Therefore, the pressurized oil from the hydraulic pump 11 is delivered through the pump line 13, the valve device 16 and the hydraulic conduit 15A into the oil chamber A in the hoist cylinder 10, and on the other hand, the oil liquid in the oil chamber B is returned through the hydraulic conduit 15B, the valve device 16 and the tank line 14 to the tank 12.

As a result, the piston rod 10C in the hoist cylinder 10 extends by the pressurized oil in the oil chamber A, and the vessel 3 is raised to the dumping position shown in FIG. 2 and FIG. 3 in such a manner as to be tilted diagonally backward by the hoist cylinder 10. As a result, the vessel 3 is rotated to a tilting posture by the use of the connecting pin 5 as a fulcrum. Therefore, the crushed stones 4 in the vessel 3 are dumped to the cargo collection site in such a manner as to slide downward. Thereafter, the processing subsequent to step 7 is performed as described before.

Next, when it is determined as "YES" at step 8, there is a case where the inner pressure P in the rear suspension 8A is lower than the determination pressure Pa. In this case, the vessel 3 is tilted largely backward of the vehicle body 2 by the raising control of the vessel 3 as described above and it can be determined that a so-called jack-up state that the side of the rear wheel 8 of the vehicle body 2 is raised upward (the direction of the arrow H in FIG. 3) starts to occur.

Namely, in the course of extending the hoist cylinder 10 in the direction of the arrow E in FIG. 3 to tilt the vessel 3 largely backward in such a manner as to rotate it in the direction of the arrow G, when the rear end portion of the vessel 3 runs on the dumped banking 4A, a reaction generated by the extension operation of the hoist cylinder 10 acts on the side of the rear wheel 8 of the vehicle. Therefore, the side of the rear wheel 8 of the vehicle is raised upward (the direction of the arrow H in FIG. 3) to generate the jack-up state. In consequence, in the rear suspension 8A suspending the side of the rear wheel 8 of the vehicle, the load (spring load) as a vehicle weight is rapidly reduced. Therefore, the inner pressure P in the rear suspension 8A detected by the pressure sensor 25 is rapidly lowered.

Therefore, in the processing at step 8, it is determined whether or not the inner pressure P in the rear suspension 8A is lower than a low-pressure to the extent that can not be normally generated (determination pressure Pa as a pressure value). When it is determined as "YES" at step 8, it can be determined that the vehicle starts to jack up. Therefore, the process goes to step 9, wherein the controller 27 outputs a signal for activating a warning and performs a display of warning "jack-up" on a screen of the monitor 26 shown in FIG. 4.

At next step 10, the controller 27 outputs a stop signal of stopping the raising control of the vessel 3 to the pilot pressure generator 22. Therefore, the pilot pressure supplied to the hydraulic pilot portions 16A and 16B in the valve device 16 is rapidly lowered to the order of the tank pressure. In consequence, the valve device 16 can be quickly returned back to the neutral position (N). As a result, the extension operation of the hoist cylinder 10 is stopped, thus making it possible to restrict the vessel 3 to tilt backward any more.

At this time, when the operator tilts the control lever 20A in the direction of the arrow D in FIG. 4 according to the warning of "jack-up" as described before, the valve device 16 is switched from the neutral position (N) to the floating position (F) or the lowering position (L). Therefore, the hoist cylinder 10 can be contracted to rotate the vessel 3 in such a manner as to fall and turn downward.

In this way, by the processing at step 4 to step 10, the jack-up state of the vehicle can be easily solved. Thereafter, at step 7 it is determined whether or not the engine switch 24 is "OFF" (opened). Since the engine 9 is in a working state while at step 7 it is determined as "NO", the process goes back to step 1, and the processing subsequent to this step continues to be performed. When at step 7 it is determined as "YES", the processing operation ends.

Thus, according to the present embodiment, when the inner pressure P in the rear suspension 8A detected by the pressure sensor 25 is lower than the predetermined pressure value (determination value Pa) in a state where the vessel 3 as the loading platform is in the middle of being tilted backward by the hoist cylinder 10, the extension operation of the hoist cylinder 10 is stopped. Therefore, the following effect can be obtained.

That is, in the course of largely tilting the vessel 3 backward of the vehicle body 2 by the hoist cylinder 10, when the rear end portion of the vessel 3 starts to run on the banking 4A of the dumped earth and sand, the reaction generated by the extension operation of the hoist cylinder 10 acts on the side of the rear wheel 8 of the vehicle. Therefore, the side of the rear wheel 8 of the vehicle is raised upward (the direction of the arrow H in FIG. 3) to generate the so-called jack-up state.

Followed by the jack-up, the load (spring load) as a vehicle weight to be applied to the rear suspension 8A suspending the side of the rear wheel 8 of the vehicle weight is rapidly reduced. In this way, the inner pressure P in the rear suspension 8A detected by the pressure sensor 25 is rapidly lowered to become a pressure which is extremely lower as compared to the determination pressure Pa.

Therefore, in this case occurrence of the jack-up state can be suppressed by stopping the extension operation of the hoist cylinder 10. As a result, the extent of giving an uncomfortable feeling to an operator in the cab 6 can be reduced, and stability, security, reliability and the like as the dump truck 1 can be further enhanced.

In addition, when the inner pressure P in the rear suspension 8A is lower than the determination pressure Pa, a signal for informing the jack-up state of the vehicle body 2 is outputted. Thereby, even in a case where the extension operation of the hoist cylinder 10 is rapidly stopped, the operator can obtain the reason on the spot and appropriately take emergency action after that. That is, the operator can perform an operation of lowering the vessel 3 from a tilting state to a lowering position by the control lever 20A to easily solve the jack-up state of the vehicle.

Further, since a change in the inner pressure of the rear suspension 8A is detected by the pressure sensor 25, a "jack-up" state of the vehicle can be easily determined using the existing rear suspension 8A. In addition, a mounting operation of the pressure sensor 25 to the rear suspension 8A can be easily performed.

It should be noted that the aforementioned embodiment has explained a case of detecting whether or not the vessel 3 is seated on the vehicle body 2 by the seating sensor 23, as an example. However, the present invention is not limited to this particular example. For instance, a configuration may be provided in which a tilting angle of the vessel 3 is detected by use of an angle sensor or the like and by the tilting angle it is determined whether or not the vessel 3 is seated on the vehicle body 2 or whether or not the raising operation of the vessel 3 is performed.

Further, the aforementioned embodiment has explained a case where the valve device 16 having four positions as shown in FIG. 4 is configured by use of one directional control valve or the like, as an example. However, the present invention is not limited to this particular example. The valve device may be configured by using a combination of two directional control valves. The valve device thus configured by using the two directional control valves is also controlled to be switched to either one of the neutral position (N), the raising position (R), the floating position (F) and the lowering position (L).

In addition, the aforementioned embodiment has explained a case of performing a display for warning a "jack-up" state of the vehicle by the monitor 26 exemplified in FIG. 4, as an example. However, the present invention is not limited to this particular example. For instance, a configuration may be provided in which the jack-up state of the vehicle may be informed to an operator by using, for example, a sound synthesizer, a warning buzzer, a lamp or the like.

Furthermore, the aforementioned embodiment has explained the rear wheel drive type dump truck 1 as the transporter vehicle, as an example. However, the present invention is not limited to this particular example. For instance, the transporter vehicle may be applied to, a front wheel drive type dump truck or a four-wheel drive type dump truck driving front and rear wheels. Further, the transporter vehicle may be applied to a transporter vehicle other than the dump truck equipped with wheels for travelling.

DESCRIPTION OF REFERENCE NUMERALS

1: Dump truck (Transporter vehicle)
2: Vehicle body
3: Vessel (Loading platform)
4: Crushed stones (Objects to be transported)
4A: Banking
5: Connecting pin
6: Cab
7: Front wheel
7A: Front suspension
8: Rear wheel
8A: Rear suspension
9: Engine
10: Hoist cylinder
11: Hydraulic pump (Hydraulic source)
12: Operating oil tank (Hydraulic source)
16: Valve device
20: Operating lever device
20A: Control lever
21: Lever sensor (Position detecting means)
22: Pilot pressure generator (Electricity/Hydraulic conversion device)
23: Seating sensor
25: Pressure sensor
26: Monitor (Informing means)
27: Controller (Control means)
(N): Neutral position
(R): Raising position
(F): Floating position
(L): Lowering position

The invention claimed is:

1. A transporter vehicle comprising: an automotive vehicle body with front wheels and rear wheels; a loading platform tiltably provided on said vehicle body to load an object to be transported; a hoist cylinder telescopically provided between said loading platform and said vehicle body and tilting said loading platform backward by extending a piston rod of the hoist cylinder in an extension direction at the time of dumping said object to be transported from said loading platform; a rear suspension provided between a rear side of said vehicle body and said rear wheels; and a controller for controlling a motion of said hoist cylinder, further including:
a pressure sensor provided in said rear suspension for detecting an inner pressure in said rear suspension, and
said controller, in a case where the inner pressure in said rear suspension detected by said pressure sensor is lowered in the course of extending said hoist cylinder for tilting said loading platform backward being configured to perform control of stopping the motion of said hoist cylinder in the extension direction.

2. A transporter vehicle according to claim 1, wherein said controller is further configured to output a signal for indicating that said vehicle body is in a jack-up state when the inner pressure in said rear suspension is lower than a predetermined pressure value.

3. A transporter vehicle according to claim 2, wherein said predetermined pressure value is set to a value lower than the inner pressure in said rear suspension detected by said pressure sensor in an unloading state where said loading platform is empty.

4. A transporter vehicle according to claim 1, further comprising: a hydraulic source supplying and discharging pressurized oil to and from said hoist cylinder for extending and contracting said hoist cylinder; and a valve device provided between said hydraulic source and said hoist cylinder to control the supply and discharge of said pressurized oil to and from said hoist cylinder,
wherein said valve device has plural switching positions including a raising position of raising said loading platform by extending said hoist cylinder with the supply and discharge of said pressurized oil, a lowering position of rotating said loading platform downward by contracting said hoist cylinder with the supply and discharge of said pressurized oil, a floating position that allows said loading platform after, being raised, to be lowered by its own weight to contract said hoist cylinder, and a neutral position of stopping a motion of said hoist cylinder by stopping the supply and discharge of said pressurized oil.

5. A transporter vehicle according to claim 4, wherein said controller is further configured such that, at the time of extending said hoist cylinder by switching said valve device to said raising position according to the operation for tilting said loading platform backward, when the inner pressure of said rear suspension is lowered, said valve device is switched from said raising position to said neutral position.

* * * * *